Nov. 16, 1948.　　　A. W. PAYNE　　　2,453,724
COILING MACHINE
Filed July 26, 1945　　　3 Sheets-Sheet 1
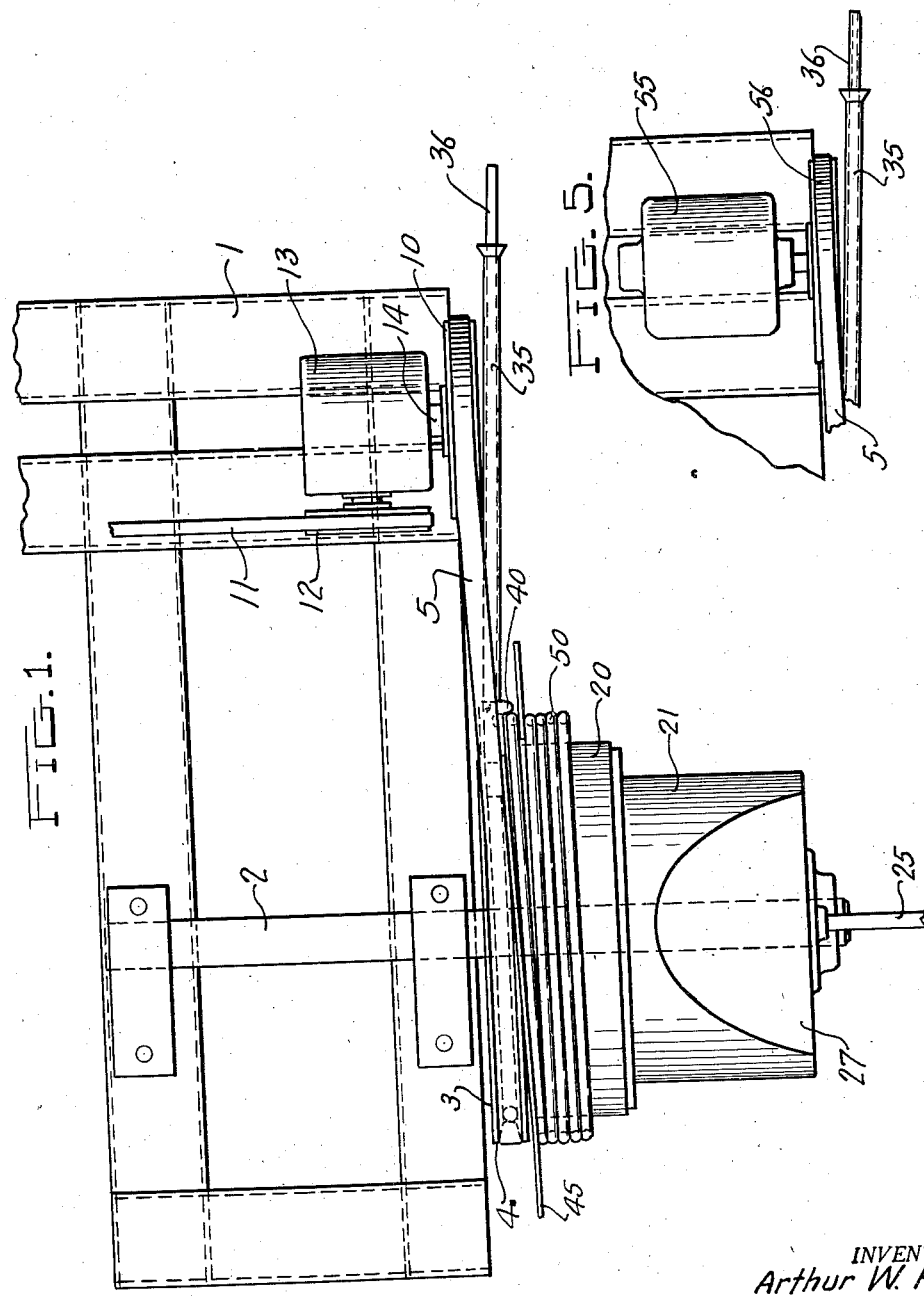
INVENTOR.
Arthur W. Payne
BY
Barnes, Kisselle, Laughlin & Raisch
Attorneys Nov. 16, 1948.　　　A. W. PAYNE　　　2,453,724
COILING MACHINE
Filed July 26, 1945　　　3 Sheets-Sheet 2
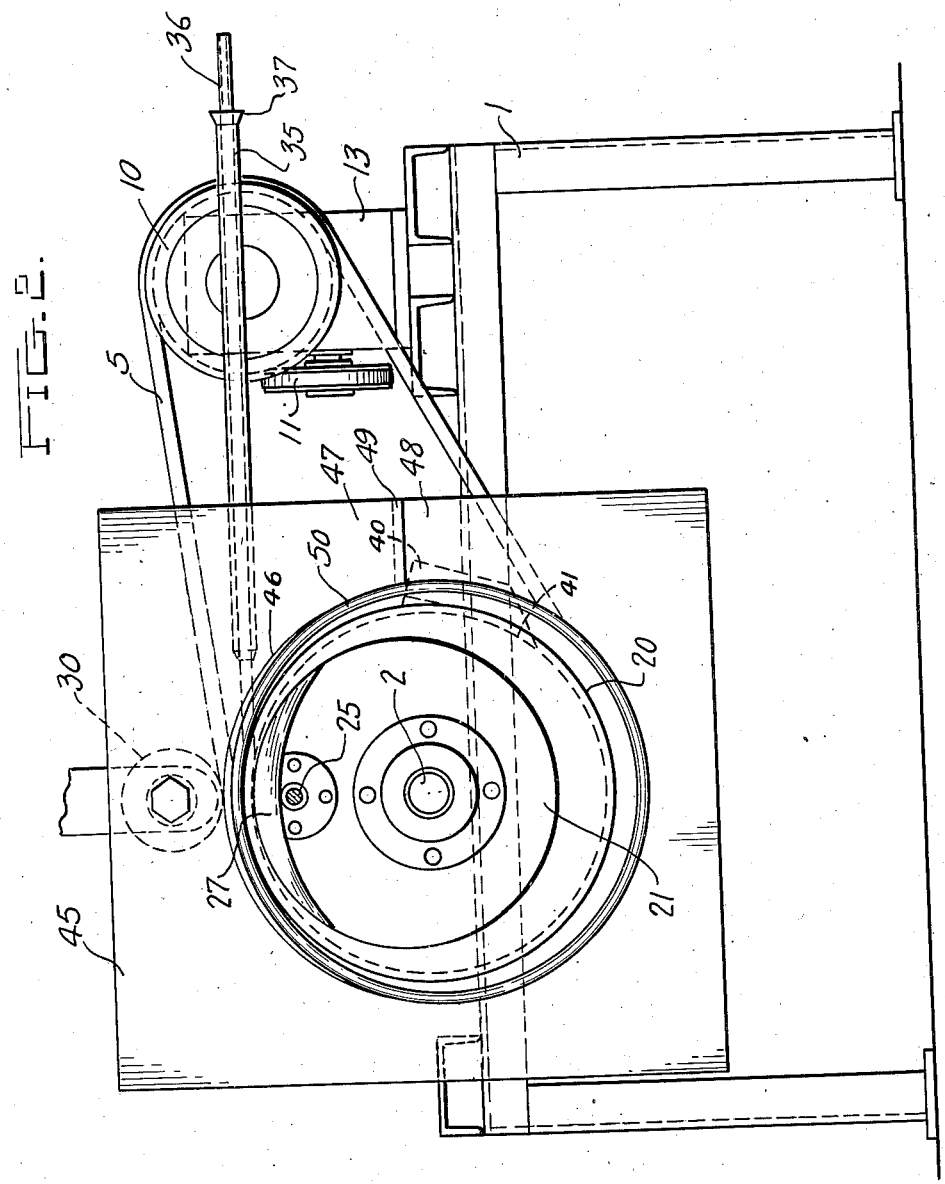
INVENTOR.
Arthur W. Payne
BY

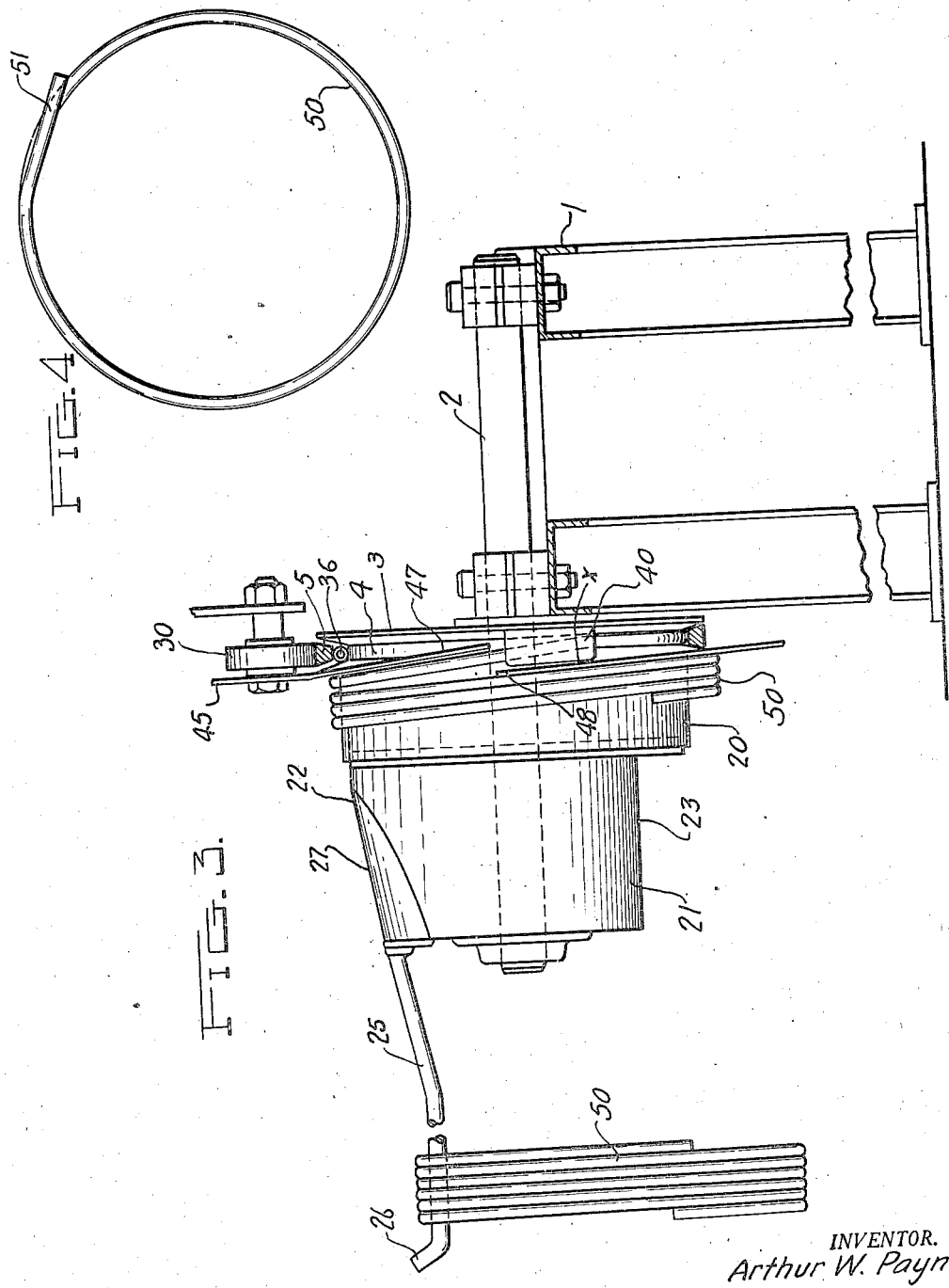

Patented Nov. 16, 1948

2,453,724

UNITED STATES PATENT OFFICE 2,453,724

COILING MACHINE

Arthur W. Payne, Detroit, Mich., assignor to Bundy Tubing Company, Detroit, Mich., a corporation of Michigan Application July 26, 1945, Serial No. 607,216

6 Claims. (Cl. 153—64)

This invention relates to an apparatus for forming lengths of metal stock into coils and particularly for the forming of tubing in the coils.

It is desirable in some instances, and for some trades, that a manufacturer of tubing form the same into coils for shipment and handling. One example of such an instance is the provision of tubing which is to be stocked at outlets and sold for replacement and repair and like purposes. On the other hand, it may be desirable to furnish tubing to manufacturers of other equipment who prefer to shape and assemble the tube in their own equipment such, for example, as heat exchangers.

One form of tubing to which the invention is applicable is steel tubing which is fashioned from strip steel stock and sealed by a copper welding or copper brazing process and in which the tube may be coated with copper inside and out. On the other hand, steel tubing with a butt welded seam may be handled and coiled on the machine of the present invention. The coiling of such tubing has heretofore presented a rather difficult problem in that the steel tubing is difficult to handle and the coiling apparatus awkward and slow of manipulation.

The present invention aims to provide a simple rapidly operating machine which functions in an automatic manner to rapidly fashion lengths of tubing into coils and wherein the coils are accurately and nicely formed. To this end, and very briefly, the apparatus takes the form of an endless belt operating over a suitable pulley and the tubing is fed in between the belt and the surface of the pulley so that, in the rotation thereof, the tubing is formed around the pulley thus completing a convolution of a coil. The operation continues forming successive convolutions in which action the already formed convolutions have a rotary action, free however, of any operating mechanism. While the invention is specified as being applicable for bending tubing it may be used for bending other long lengths such as rods or bars or the like.

An apparatus constructed in accordance with the invention is shown in the accompanying drawing:

Fig. 1 is a top plan view of a structure made in accordance with the invention.

Fig. 2 is a side elevational view.

Fig. 3 is an end view showing the belt and part of the tubing in section.

Fig. 4 is an end elevational view of a coil formed by the apparatus.

Fig. 5 is a top plan view of a modified form.

In the structure, as shown in the drawings, there is a suitable table or support 1 mounted upon which is an axis shaft 2 which may be a stationary shaft. Journalled on the shaft is a pulley 3 formed with a peripheral groove 4 for the reception of a belt 5. Preferably, the belt is of the so-called V-type and the pulley groove is such as to accommodate the V-belt.

The pulley 3 runs freely and may, therefore, be considered an idler pulley and the belt 5 runs over a driving pulley 10. As shown in Fig. 1 the pulley 10 is driven by a driving belt 11 which may run over a pulley of a suitable driving motor (not shown) and which functions over a power input pulley 12 of a speed control transmission 13 which has a driven shaft 14 upon which the pulley 10 is mounted.

Attached to the pulley 3 and projecting from one side thereof is a drum 20. This drum has sufficient axial extent to accommodate one formed coil. Associated with the rotary drum 20 is a stationary drum 21 which may be mounted upon the shaft 2. The upper surface of this drum, as indicated at 22, is preferably inclined downwardly while its uppermost portion thereof lies in close proximity to the periphery of the rotary drum 20. The stationary drum 21 preferably telescopes into the rotary drum 20. The underside of the stationary drum 22 is formed as shown at 23 on a reduced radius. Projecting from the upper portion of the stationary drum is a hanger or receiver 25 which preferably is downwardly inclined for a suitable distance and which has an abutment 26 at its end for purposes which will presently appear. An adjustable idler pulley 30 may be positioned in spaced relationship relative to the belt 5 at the location where the tubing is fed into the groove 4 and under the belt.

As will be seen by reference to Fig. 1, the pulley 10 is offset relative to the pulley 2 to provide for the location of an entrance guide 35 for the length of tubing 36. This guide tube has its entrance end 37 in a convenient location while its outlet end 38 is positioned in close proximity to the confluence of the pulley groove 4 and the belt 5 as shown in Fig. 2.

There is a throw out shoe 40 having an angularly disposed guiding portion 41 positioned substantially in the groove 4 and located relative to the pulley 2 as shown in Fig. 2. The angular guiding portion 41 engages the tube, and particularly the leading end thereof, to guide it laterally out of the groove as shown in Fig. 3. There is also preferably a sheet metal guard and guide generally illustrated at 45. This sheet metal member may support the shoe 40 by being secured thereto at the location x (Fig. 3) and it is mounted in a stationary position. The plate has an aperture therein, as shown at 46, which freely surrounds the rotary drum 20 and at a point adjacent the shoe 40 the plate is slotted as at 49. The plate is fashioned with a sort of a twist formation so that the wing 47, which is above slot, as Figs. 2 and 3 are viewed, extends angularly and partially into or over the plane of the pulley 3, whereas the wing 48 below the slot is fashioned to extend angularly in the opposite direction. Thus, the plate is formed to provide a sort of a screw action. The finished coil of tube is shown at 50 and the extreme ends thereof may have a relatively straight form, as shown at 51.

A modified form of the arrangement is shown in Fig. 5. In this form the coiling apparatus is the same as the apparatus above described, the difference being in that the belt is directly driven by a motor 55, the belt operating over the pulley 56 on the motor shaft.

In the operation of the apparatus it is set into motion either by the driving belt 11 or the motor 55 and the V-belt runs freely over both of its pulleys. The drum 20 also rotates with clearance relative to the guide plate 45 and with clearance relative to the fixed drum 22. An operator now advances a length of tubing, as shown at 36, into the entrance guide 35 and pushes the end of the tube into the confluence of the pulley and the belt. The tube enters substantially tangentially. The tube is thus gripped between the pulley and the belt and is picked up, so to speak, and wrapped around the pulley with substantially the speed of movement of the pulley. The action can be set to operate at a very fast speed. Thus, the tube is fashioned into curved form as it is in engagement with the pulley and held thereagainst by the belt for a considerable angular extent.

When the leading end of the tube advances to the shoe it is engaged by the angular shoe portion 41 and shifted laterally from the groove. This shift is to the left as Fig. 3 is viewed. The leading end then engages behind the wing 47 and continues its rotary movement around and with the drum 20. This completes the first convolution and succeeding convolutions of the coil are made with the entire coil rotating with the rotation of the pulley and the drum 20. The formed convolutions rest upon the rotary drum and the peripheral speed thereof is the same as the pulley. When the trailing end of tube passes the shoe 41, the coil being still rotating, the angular disposition of the wing 47 provides sufficient lateral action on the coil that it slips off the drum 20 to the left as Fig. 1 is viewed onto the stationary drum 3. The coil is not tightly wound upon the drum 20 as the natural spring in the metal causes the coil to expand somewhat so that its inside diameter exceeds that of the drum and for that matter exceeds that of the bottom of the groove 4. As the rotating coil slides onto the fixed drum 20 it is decelerated by its frictional engagement with the top surface 22 of the fixed drum and then the coil slides on down the hanger 25 and stops at the end thereof by reason of the abutment 26 at which time it may be lifted off. The upper surfaces 22 of the stationary drum may be provided with special friction material as shown at 27 for decelerating the coils. A succeeding length of tube may be fed to the apparatus so that it immediately follows the preceding length.

The ends of the coil as mentioned above, may be substantially straight for a relatively short distance as shown at 51. This comes about because the tubing is sufficiently strong to resist bending until the leverage action is adequate. This, of course, would vary with other elements and factors such as the material of which the tube is made, the size of the tube, the thickness of its wall and the tightness of the belt, etc. In other words, the leading end of the tube may advance between the pulley and the belt a few inches before there is any bending action. Likewise the trailing end of the tube may be substantially straight. This, however, is a convenient coil structure for later handling. No particular helix is given to the coil as this is unnecessary. The convolutions are identically formed and due to the lack of a helix in fashioning the coil the convolutions are held in close contact with each other.

I claim:

1. An apparatus for forming work pieces such as lengths of tubing or the like into coils which comprises, the combination of a rotary forming pulley, a second pulley spaced from the forming pulley, a belt operating over the pulleys, means for guiding a work piece into the confluence of the belt and the forming pulley, and guiding means positioned adjacent the periphery of the forming pulley in a location between separation of and the confluence of the forming pulley and the belt for engaging the work piece and shifting it axially out of the confluence of the belt and the pulley.

2. An apparatus for forming work pieces such as lengths of tubing or the like into coils which comprises, a rotary forming pulley having a peripheral groove, a second pulley spaced from the forming pulley, a V-belt operating over the pulleys and in said groove, means for guiding a work piece into the confluence of the forming pulley and the belt, and means between the confluence and the separation of the forming pulley and the belt for engaging the work piece and shifting it axially out of the confluence.

3. An apparatus for forming work pieces such as lengths of tubing or the like into coils which comprises, a rotary forming pulley having a peripheral groove, a second pulley spaced from the forming pulley, a belt operating over the pulleys and in said groove, a guide device for guiding a work piece lengthwise for introducing its leading end into the confluence of the forming pulley and the belt, and a throw out guide positioned between the confluence of and the separation of the forming pulley and the belt for engaging the work piece and shifting the same axially out of the groove of the forming pulley.

4. An apparatus for forming work pieces such as lengths of tubing or the like into coils which comprises, a rotary forming pulley having a peripheral groove, a second pulley spaced from the forming pulley, a belt operating over the pulleys and in said groove, means for guiding a work piece into the confluence of the forming pulley and belt, a throw out guide positioned between the confluence of and the separation of the pulley and the belt for shifting the work piece axially out of the groove of the forming pulley, and a rotary drum positioned adjacent the pulley for receiving the rotating coiled work piece.

5. An apparatus for forming work pieces such as lengths of tubing or the like into coils which comprises, a rotary forming pulley having a peripheral groove, a second pulley spaced from the forming pulley, a belt operating over the pulleys and in said groove, means for guiding a work piece into the confluence of the forming pulley and belt, a throw out guide positioned between the confluence of and the separation of the pulley and the belt for shifting the work piece axially out of the groove of the forming pulley, a rotary drum positioned adjacent the pulley for receiving the rotating coiled work piece, and a stationary drum positioned adjacent the rotary drum upon which the coiled work piece moves and serving to decelerate rotation of the coiled work piece.

6. An apparatus for forming work pieces such as lengths of tubing or the like into coils which comprises, a rotary forming pulley having a peripheral groove, a second pulley spaced from the forming pulley, a belt operating over the pulleys and in said groove, means for guiding a work piece into the confluence of the forming pulley and belt, a throw out guide positioned between the confluence of and the separation of the pulley and the belt for shifting the work piece axially out of the groove of the forming pulley, and a drum secured to the pulley to rotate therewith for receiving the revolving work piece coil, and stationary means contiguous to the rotary drum for receiving work piece coils.

ARTHUR W. PAYNE.

REFERENCES CITED

The following references are of record in the file of this patent:

UNITED STATES PATENTS

| Number | Name | Date |
| --- | --- | --- |
| 1,023,099 | Shuster | Apr. 9, 1912 |
| 1,230,750 | Menzer | June 19, 1917 |
| 1,282,236 | Kenworthy | Oct. 22, 1918 |
| 1,417,249 | Kardong | May 23, 1922 |
| 1,826,612 | Gail | Oct. 6, 1931 |
| 1,959,418 | Fourness | May 22, 1934 |
| 2,007,303 | Miller et al. | July 9, 1935 |
| 2,339,424 | Poole | Jan. 18, 1944 |